US012734832B2

(12) United States Patent
Nakaya et al.

(10) Patent No.: US 12,734,832 B2
(45) Date of Patent: Sep. 15, 2026

(54) RECORDING APPARATUS WITH DRYING UNIT, DOWNSTREAM OF RECORDING UNIT, THAT BLOWS AIR AGAINST RECORDING MEDIUM

(71) Applicant: CANON KABUSHIKI KAISHA, Tokyo (JP)

(72) Inventors: Yusuke Nakaya, Tokyo (JP); Shoichi Zensai, Kanagawa (JP); Yohei Kusano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 18/621,307

(22) Filed: Mar. 29, 2024

(65) Prior Publication Data

US 2024/0343048 A1 Oct. 17, 2024

(30) Foreign Application Priority Data

Apr. 14, 2023 (JP) ................................ 2023-066759

(51) Int. Cl.
*B41J 11/00* (2006.01)

(52) U.S. Cl.
CPC .............................. *B41J 11/00222* (2021.01)

(58) Field of Classification Search
CPC ................ B41J 11/00222; B41J 15/165; B41J 11/0022; F26B 13/005; F26B 13/10; F26B 13/104; F26B 21/004; F26B 21/04; F26B 21/10; F26B 21/12
See application file for complete search history.

(56) References Cited

U.S. PATENT DOCUMENTS 6,463,674 B1 * 10/2002 Meyers ................ F26B 21/086 34/304
10,493,782 B2 12/2019 Sato
10,500,839 B2 12/2019 Sato
11,571,916 B2 2/2023 Sato
11,919,289 B2 3/2024 Ackermann
(Continued)

FOREIGN PATENT DOCUMENTS

JP 2009133525 A * 6/2009
JP 2010208100 A * 9/2010 .......... B41J 11/0022
(Continued)

OTHER PUBLICATIONS

Sep. 10, 2024 European Official Action in European Patent Appln. No. 24168211.1.

*Primary Examiner* — Bradley W Thies
(74) *Attorney, Agent, or Firm* — Venable LLP

(57) ABSTRACT

A drying unit includes: a first space; a first nozzle provided in the first space; a first air blowing unit that supplies air inside of the first space to the first nozzle; a second space provided adjacent to the first space on a downstream side in a conveyance direction of the first space and communicates with the first space; a second nozzle provided in the second space; a heater that heats air inside of the second space; a second air blowing unit that supplies the heated air to the second nozzle; a third space provided adjacent to the second space; and a third air blowing unit that sucks air inside of the third space and exhausts the air to outside of the drying unit. A direction in which air is blown out from the first nozzle has a component directed toward the second space in the conveyance direction.

21 Claims, 12 Drawing Sheets

(56) References Cited

U.S. PATENT DOCUMENTS

| | | | |
|---|---|---|---|
| 2004/0061758 | A1 | 4/2004 | Patterson |
| 2015/0174924 | A1 | 6/2015 | Fuchioka |
| 2021/0354489 | A1 | 11/2021 | Rohl |
| 2023/0091887 | A1 | 3/2023 | Nakaya |
| 2023/0173803 | A1 | 6/2023 | Ackermann |

FOREIGN PATENT DOCUMENTS

| | | | |
|---|---|---|---|
| JP | 2012-020507 | A | 2/2012 |
| WO | 2021/223787 | A1 | 11/2021 |

* cited by examiner

RECORDING APPARATUS WITH DRYING UNIT, DOWNSTREAM OF RECORDING UNIT, THAT BLOWS AIR AGAINST RECORDING MEDIUM

BACKGROUND OF THE INVENTION

Field of the Invention

The present invention relates to a recording apparatus.

Description of the Related Art

Recording apparatuses having a drying unit that blows hot air against a printed recording medium to dry the same have been known. Japanese Patent Application Laid-open No. 2012-20507 describes a configuration in which a drying unit is provided with a plurality of blowing nozzles including an upstream blowing nozzle and a downstream blowing nozzle in a conveyance direction of a recording medium to suppress the influence of hot air on members surrounding the drying unit in a printing machine that performs sheet printing. In Japanese Patent Application Laid-open No. 2012-20507, low-temperature air from the upstream blowing nozzle is caused to function as an air curtain to suppress leakage of high-temperature air from the downstream blowing nozzle to surroundings of the drying unit.

However, in the configuration of Japanese Patent Application Laid-open No. 2012-20507, there is a possibility that a sheet is unevenly dried when hot air is positively blown out so as to be taken into the drying unit in order to suppress leakage of high-temperature air to members close to the drying unit in the conveyance direction.

SUMMARY OF THE INVENTION

The present invention appropriately performs drying of a recording medium.

One aspect of the present invention is a recording apparatus comprising:

a recording unit that ejects ink onto a recording medium conveyed in a conveyance direction by a conveyance unit; and a drying unit that is provided downstream of the recording unit in the conveyance direction and blows air against the recording medium while conveying the same to dry the ink on the recording medium, wherein the drying unit has a first space, a first nozzle that is provided in the first space and open opposite to the recording medium, a first air blowing unit that supplies air inside of the first space to the first nozzle so that the air blows out from the first nozzle to the recording medium, a second space that is provided adjacent to the first space on a downstream side in the conveyance direction of the first space and communicates with the first space, a second nozzle that is provided in the second space and open opposite to the recording medium, a heater that heats air inside of the second space, a second air blowing unit that supplies air heated by the heater to the second nozzle so that the air blows out from the second nozzle to the recording medium, a third space that is provided adjacent to the second space on a downstream side in the conveyance direction of the second space and communicates with the second space, and a third air blowing unit that is provided in the third space, sucks air inside of the third space via a third nozzle open opposite to the recording medium, and exhausts the air inside of the third space to outside of the drying unit, and a direction in which air is blown out from the first nozzle has a component directed toward the second space in the conveyance direction.

According to the present invention, it is possible to appropriately perform drying of a recording medium.

Further features of the present invention will become apparent from the following description of exemplary embodiments with reference to the attached drawings.

DESCRIPTION OF THE EMBODIMENTS

With reference to the drawings, a mode for carrying out the present invention will be exemplarily described in detail below on the basis of embodiments. However, dimensions, materials, shapes, their relative arrangements, or the like of constituting elements described in the embodiments will not intend to limit the scope of the present invention unless otherwise specifically noted. Further, "at least one of A or B" will indicate "A, B, or A and B" in the present disclosure.

First Embodiment

A recording apparatus 1 according to a first embodiment is a high-speed line printer using a continuous sheet wound in a roll shape. In the following description, a sheet conveyance direction in the recording apparatus 1 will be defined as an X-direction, a sheet width direction will be defined as a Y-direction, and a vertical direction in a case where the recording apparatus is installed on a horizontal plane will be defined as a Z-direction. The X-direction, the Y-direction, and the Z-direction are orthogonal to each other.

Recording Apparatus

Figure 1:
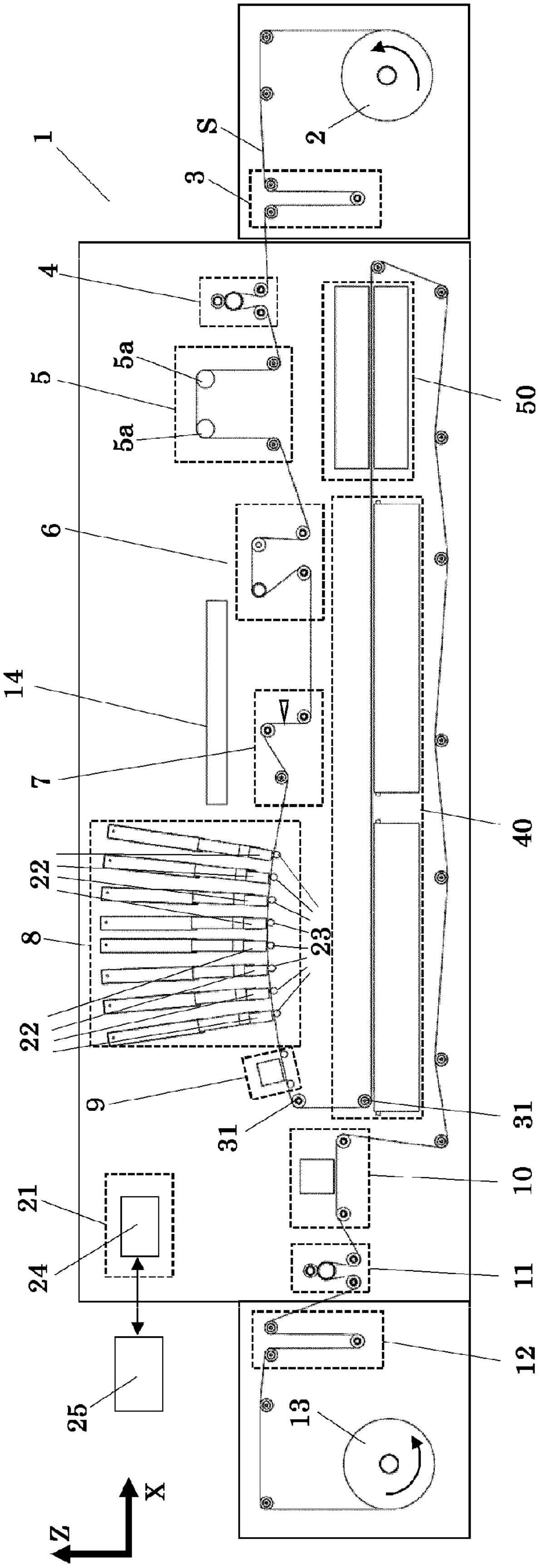
FIG. 1 is a schematic view showing the internal configuration of a recording apparatus.

FIG. 1 is a schematic cross-sectional view showing the internal configuration of the recording apparatus 1. The recording apparatus 1 has an unwinding roll unit 2, a first dancer unit 3, a first main conveyance unit 4, a meandering correction unit 5, a tension detection unit 6, a mark sensor unit 7, a recording unit 8, a first scanner unit 9, a drying unit 40, a cooling unit 50, a second scanner unit 10, a second main conveyance unit 11, a second dancer unit 12, a winding roll unit 13, and a maintenance unit 14. A sheet S is a continuous sheet-shaped recording medium. The recording apparatus 1 performs processing in respective units, while conveying the sheet S along a conveyance path indicated by a solid line in FIG. 1. Note that the sheet S is a continuous sheet-shaped recording medium in the present embodiment but may be a sheet.

The unwinding roll unit 2 is a unit that holds and supplies a continuous sheet wound in a roll shape. The unwinding roll unit 2 is configured to accommodate an unwinding roll and draw and supply the sheet S. Note that the number of rolls accommodatable in the unwinding roll unit 2 is not limited to one, but the unwinding roll unit 2 may be also configured to accommodate two or at least three rolls and selectively draw and supply the sheet S.

The first dancer unit 3 is a unit that applies constant sheet tension between the unwinding roll unit 2 and the first main conveyance unit 4. The first dancer unit 3 applies sheet tension by a tension application unit not shown.

The first main conveyance unit 4 feeds the sheet S to the meandering correction unit 5, the tension detection unit 6, the mark sensor unit 7, the recording unit 8, the first scanner unit 9, the drying unit 40, the cooling unit 50, and the second scanner unit 10 arranged in this order along the sheet conveyance path. Further, the first main conveyance unit 4 applies sheet tension between the first main conveyance unit 4 and the second main conveyance unit 11. The first main conveyance unit 4 rotates when a motor not shown is driven and conveys the sheet S with tension.

The meandering correction unit 5 is a unit that corrects meandering of the sheet S in the sheet width direction when the sheet S is conveyed with tension. The meandering correction unit 5 is configured to include meandering correction rollers 5*a* and a meandering detection sensor not shown that detects meandering of the sheet S. The meandering correction rollers 5*a* are capable of changing a tilt of the sheet S by a motor not shown, and correct meandering of the sheet S on the basis of measurement by the meandering detection sensor. At this time, the meandering correction rollers 5*a* may increase the function of correcting the meandering with the sheet S wound thereon.

The tension detection unit 6 is a unit that detects tension when the sheet S is conveyed between the first main conveyance unit 4 and the second main conveyance unit 11 with tension. Further, the tension detection unit 6 is also a unit that detects the speed of the sheet S in order to control image formation timing of the recording unit 8.

The mark sensor unit 7 is a unit that detects a mark printed in advance on the sheet S in order to control image formation timing of the recording unit 8.

Figure 2:
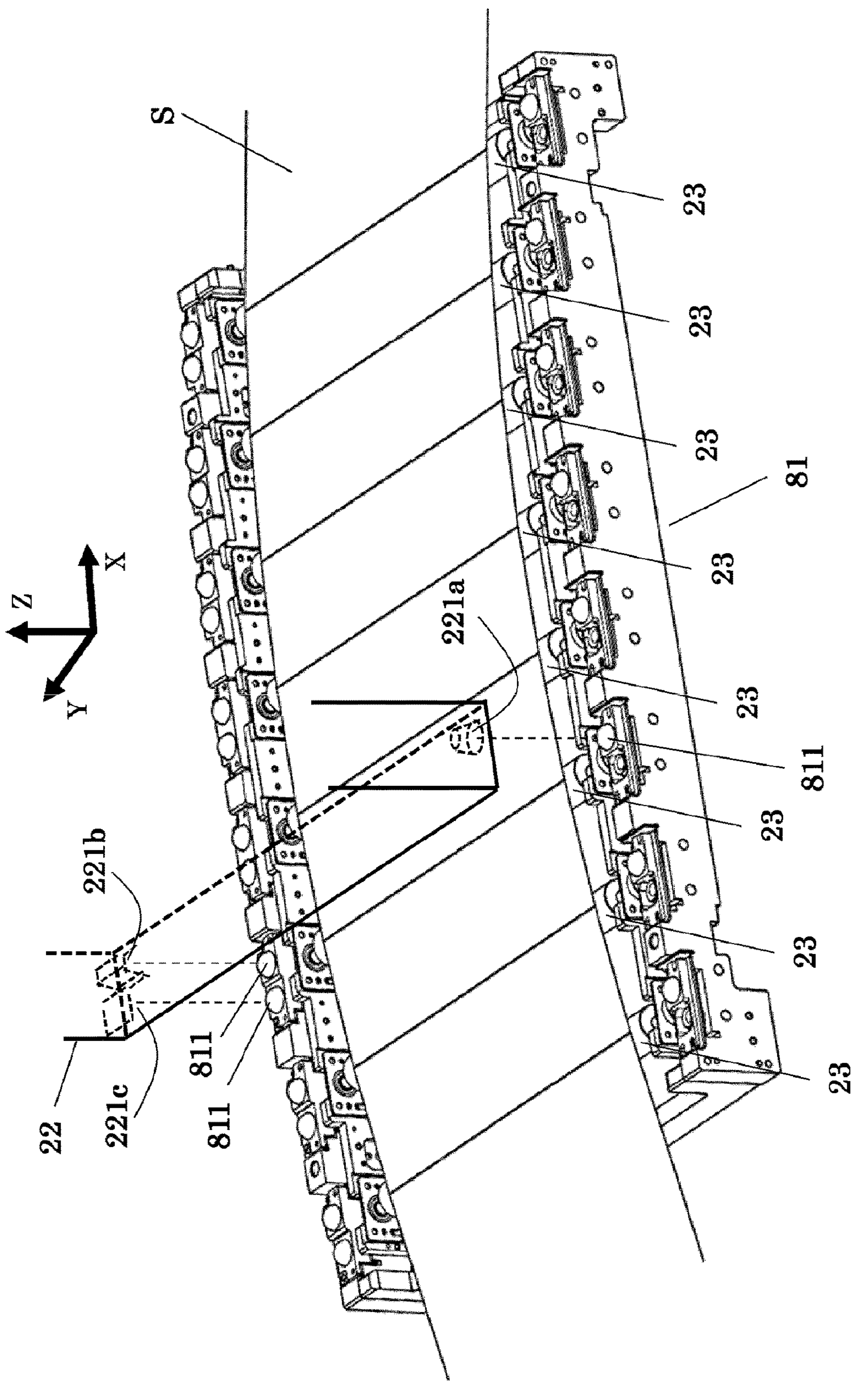
FIG. 2 is a perspective view of a sheet-conveyance-unit housing of a recording unit.
Figure 3:
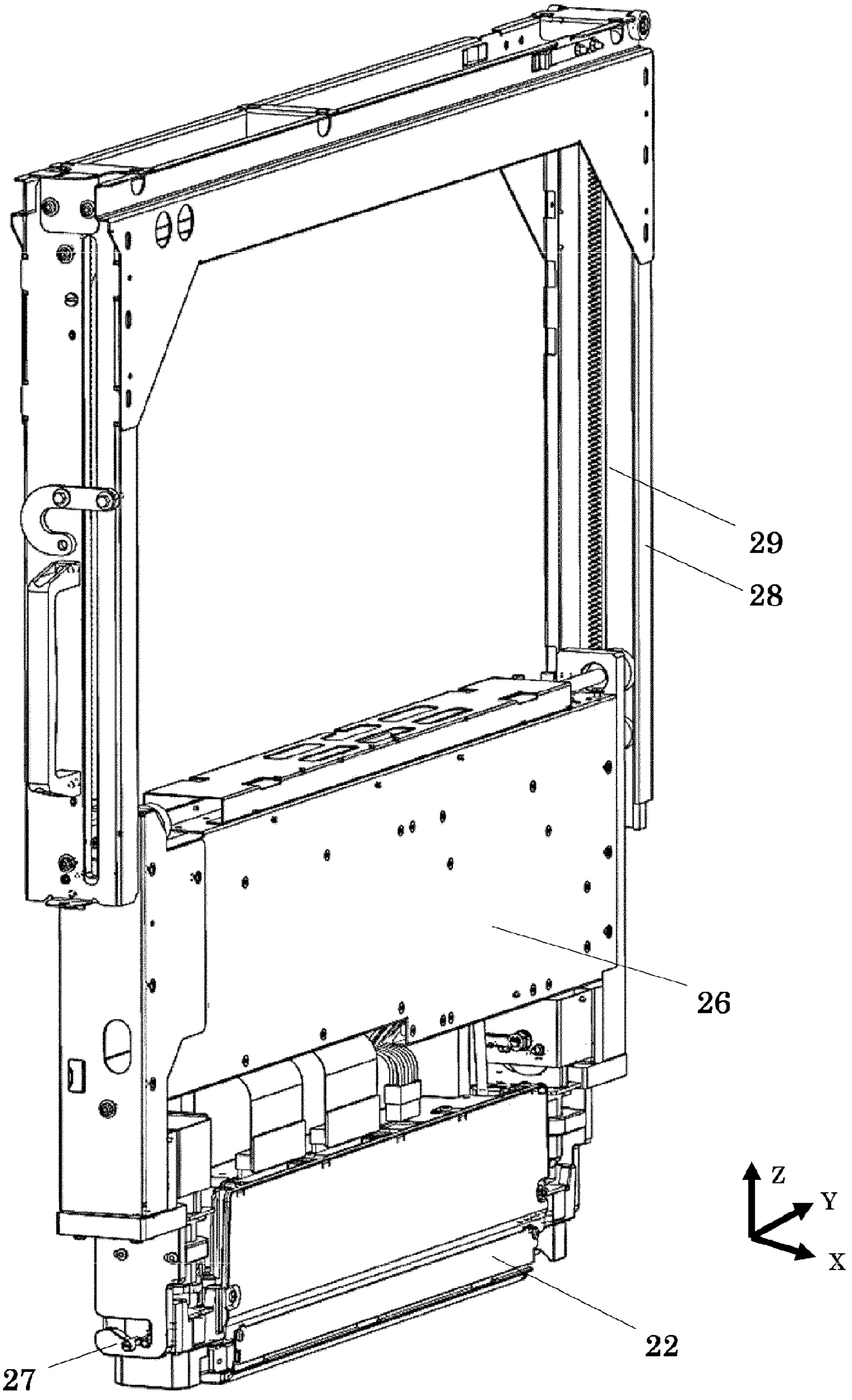
FIG. 3 is a perspective view of a recording-head lifting mechanism.

The recording unit 8 is a sheet processing unit that ejects ink onto the conveyed sheet S from above by recording heads 22 to perform recording processing on the sheet S to form an image. A conveyance path in the recording unit 8 is formed by guide rollers 23 arranged in an upwardly-protruded arc shape, and clearance is secured between the conveyance path and the recording heads 22 with constant tension applied to the sheet S. As the recording heads 22, a plurality of recording heads are arranged side by side along the conveyance direction. In the first embodiment, totally eight line-type recording heads corresponding to a reaction liquid and three specific colors in addition to four colors of Bk (black), Y (yellow), M (magenta), and C (cyan) are provided. Note that the numbers of colors and the recording head 22 are not limited to eight. As an inkjet system, a system using heater elements, a system using piezoelectric elements, a system using electrostatic elements, a system using MEMS elements, or the like is available. The respective color of ink is supplied to the recording heads 22 via respective ink tubes from ink tanks not shown. Further, as shown in FIG. 2, a plurality of recording-head positioning members 811 that perform positioning of the recording heads 22 are provided in a sheet-conveyance-unit housing 81 of the recording unit 8, and provided on both sides in the sheet-width direction across the sheet S. For each of the recording heads 22, each one recording-head positioning member 811 and each two recording-head positioning members are provided on the near side and the back side, respectively, in the sheet-width direction. Further, as shown in FIG. 3, a recording-head holding unit 26 holds and vertically lifts the recording head 22 by supporting a recording-head support shaft 27 of the recording head 22 from its lower side. The recording-head holding unit 26 vertically lifts the recording head 22 along lifting rails 29 provided in a recording-head lifting frame 28. The lifting operation is performed by a driving mechanism not shown that is provided in the recording-head holding unit 26.

The first scanner unit 9 is a unit that reads an image formed on the sheet S by the recording unit 8 during printing, detects a deviation or density of the image, and corrects the printing.

The drying unit 40 is provided downstream of the recording unit 8 in the conveyance direction of the sheet S and decreases and dries a liquid content contained in ink applied onto the sheet S by the recording unit 8 by blowing air against the sheet S while conveying the same. By the drying unit 40, fixing performance between the sheet S and the ink is enhanced. The drying unit 40 heats the recorded sheet S to dry the applied ink. Inside of the drying unit 40, hot air is applied to the passing sheet S from at least an ink application surface side to dry an ink application surface of the sheet S. Note that a drying method is not limited to a hot-air application method, but a combination of a method in which a surface of the sheet S is irradiated with electromagnetic waves (such as ultraviolet rays and infrared rays) and a conductive heat transfer method using contact of a heat generation body may be used.

A winding guide roller 31 is a roller that winds a surface on the side opposite to the ink application surface of the sheet S on a conveyance downstream side of the recording unit 8 at a constant winding angle since the influence of hot air by the drying unit 40 on the recording unit 8 is required to be blocked. In the first embodiment, two winding guide rollers 31 are arranged between the first scanner unit 9 and the drying unit 40, and the sheet S is turned down by the two winding guide rollers 31 so that a path to the recording unit 8 and a path of the drying unit 40 become substantially parallel to each other. The drying unit 40 is arranged under the recording unit 8.

The cooling unit 50 cools the sheet S fixed by the drying unit 40, solidifies softened ink, and suppresses a change in the temperature of the sheet S in a downstream process of the recording apparatus 1. Inside of the cooling unit 50, air having a temperature lower than that of the sheet S is applied to the passing sheet S from at least the ink application surface side to cool the ink application surface of the sheet S. Note that a cooling method is not limited to an air application method, but a conductive heat transfer method based on contact of a radiation member and a combination of the methods may be used.

The second scanner unit 10 is a unit that reads a test image formed on the sheet S by the recording unit 8 before printing and detects a deviation or density of the image to correct regular printing.

The second main conveyance unit 11 is a unit that conveys the sheet S while applying tension to the same with the first main conveyance unit 4 and adjusts the tension of the sheet S. The second main conveyance unit 11 rotates when driven by a motor not shown and adjusts the tension of the sheet S by a clutch (not shown) that is enabled to control a drive-linked torque according to a tension value detected by the tension detection unit 6 under a tension control unit not shown. Note that the tension detection unit 6 may control the speed of the second main conveyance unit 11 as an additional configuration to adjust the tension of the sheet S. In this case, two methods, a torque control method for controlling a value of a torque transmitted from the clutch and a speed control method for controlling the roller speed of the second main conveyance unit 11 are available as tension control methods. The tension control methods may be switched according to purposes or used at the same time.

The second dancer unit 12 is a unit that applies constant sheet tension between the second main conveyance unit 11 and the winding roll unit 13. The second dancer unit 12 applies sheet tension by a tension application unit not shown.

The winding roll unit 13 is a unit that winds the recorded sheet S on a winding core. The number of accommodatable rolls is not limited to one. As another configuration, two or at least three winding cores may be provided and selectively switched to collect the sheet S. Note that the sheet S may not be wound on a winding core depending on a processing content after recording. As another configuration, it may be possible to cut off a continuous sheet using a cutter and stack the cut-off sheets S.

A control unit 21 is a unit responsible for controlling the respective units of the recording apparatus 1. The control unit 21 has a CPU, a storage device, a controller including various control units, an external interface, and an operation unit 24 operated by a user to perform an input and an output. An operation of the recording apparatus 1 is controlled on the basis of instructions from a controller or a host apparatus 25 such as a host computer connected to the controller via an external interface.

The maintenance unit 14 is a unit including the function of recovering the ejection performance of the recording heads 22. Examples of such a mechanism include a cap mechanism to protect ink ejection surfaces of the recording heads 22, a wiper mechanism to wipe off the ink ejection surfaces, and a suction mechanism to suck ink inside of the recording heads 22 from the ink ejection surfaces by a negative pressure. Further, the maintenance unit 14 has a driving mechanism not shown and a rail, and is capable of reciprocating in a horizontal direction along the rail. The maintenance unit 14 moves to a position right below the recording heads 22 at maintenance and moves to a position away from the position right below the recording heads 22 when a maintenance operation is not performed.

Configuration of Drying Unit

Figure 4:
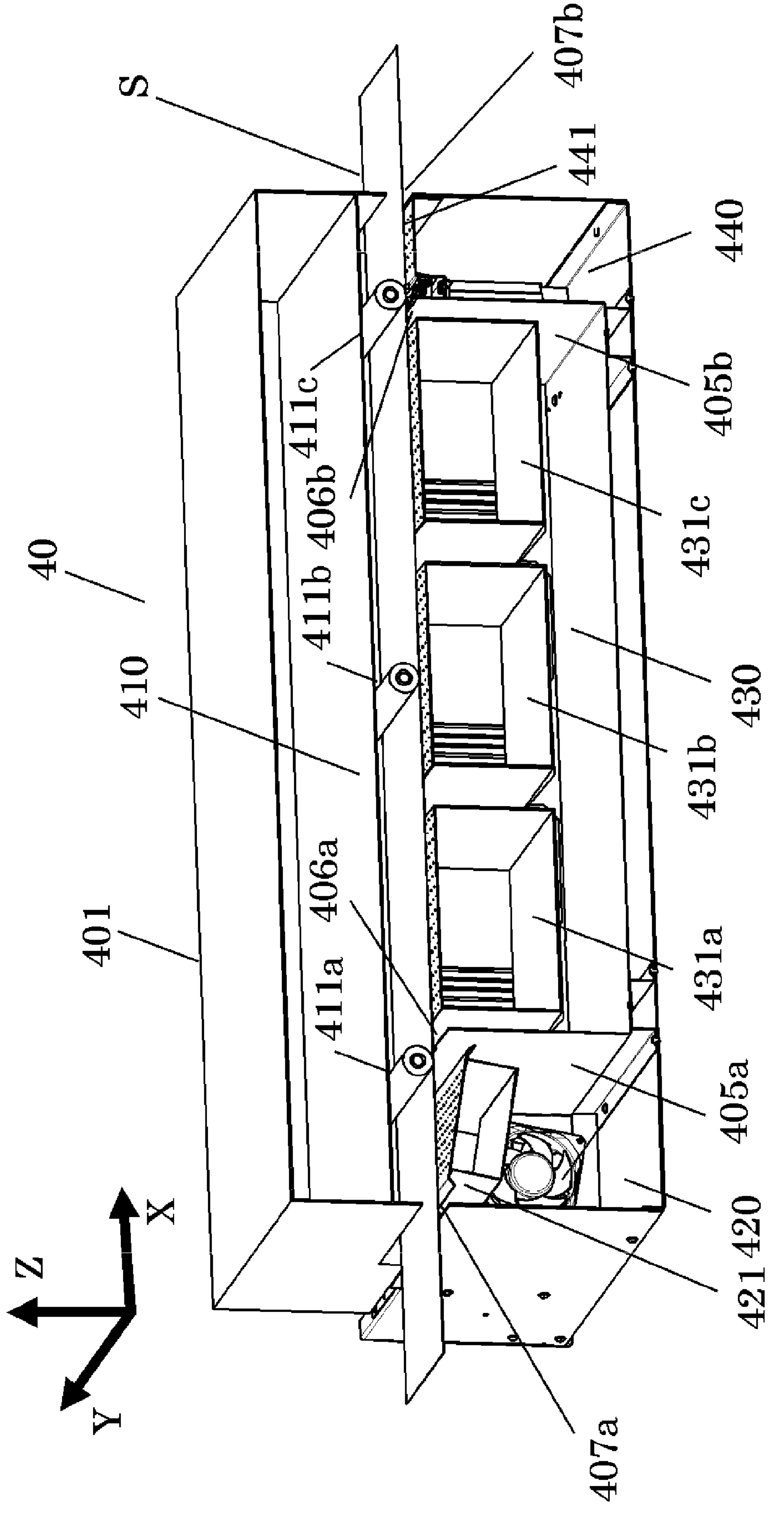
FIG. 4 is a cross-sectional perspective view showing the configuration of a drying unit according to a first embodiment.

The configuration of the drying unit 40 will be described using FIG. 4. FIG. 4 is a cross-sectional perspective view in the sheet width direction (Y-direction) showing the internal structure of the drying unit 40. The drying unit 40 has a housing 401. The housing 401 is provided with a sheet support unit 410 having a plurality of sheet support rollers 411*a*, 411*b*, and 411*c* (that will be also indicated as sheet support rollers 411 below when not distinguished from each other) arranged at positions in contact with the conveyed sheet S. The sheet support unit 410 restricts displacement of the sheet S in the Z-direction by the sheet support rollers 411.

A first space 420, a second space 430, and a third space 440 that are opposed to the sheet support unit 410, allow an interval in the −Z-direction with respect to the conveyed sheet S, and are arranged in order from an upstream side to a downstream side in the conveyance direction of the sheet S in the X-direction are provided adjacent to each other in the conveyance direction.

In the first space 420, a first nozzle 421 that allows an interval in the −Z-direction with respect to the conveyed sheet S and is open opposite to the sheet S is provided. In the first space 420, a first opening 407*a* that communicates with the outside of the drying unit 40 is provided on the side (the upstream side (−X-direction) in the conveyance direction) opposite to the second space 430 in the conveyance direction with respect to the first nozzle 421.

In the second space 430, a plurality of second nozzles 431*a*, 431*b*, and 431*c* (that will be also indicated as second nozzles 431 below when not distinguished from each other) that allow an interval in the −Z-direction with respect to the conveyed sheet S and are open opposite to the sheet S are provided. The second space 430 is provided downstream of the first space 420 in the conveyance direction of the sheet S and communicates with the first space 420.

A first partition wall 405*a* that partitions the second space 430 and the first space 420 is provided with a second opening 406*a* that provides communication between the first space 420 and the second space 430.

A second partition wall 405*b* that partitions the second space 430 and the third space 440 is provided with a third opening 406*b* that provides communication between the second space 430 and the third space 440.

The second opening 406*a* is arranged on the same side (the downstream side (+X-direction) in the conveyance direction) as the second space 430 in the conveyance direction with respect to the first nozzle 421, and arranged on the same side (the upstream side (−X-direction) in the conveyance direction) as the first space 420 in the conveyance direction with respect to the second nozzles 431.

The third opening 406*b* is arranged on the same side (the upstream side (−X-direction) in the conveyance direction) as the second space 430 in the conveyance direction with respect to a third nozzle 441, and arranged on the same side (the downstream side (+X-direction) in the conveyance direction) as the third space 440 in the conveyance direction with respect to the second nozzles 431.

In the third space 440, the third nozzle 441 that allows an interval in the −Z-direction with respect to the conveyed sheet S and is open opposite to the sheet S is provided. In the third space 440, a fourth opening 407*b* that communicates with the outside of the drying unit 40 is provided on the side (the downstream side (+X-direction) in the conveyance direction) opposite to the second space 430 in the conveyance direction with respect to the third nozzle 441.

Configuration of First Space 420

Figure 5:
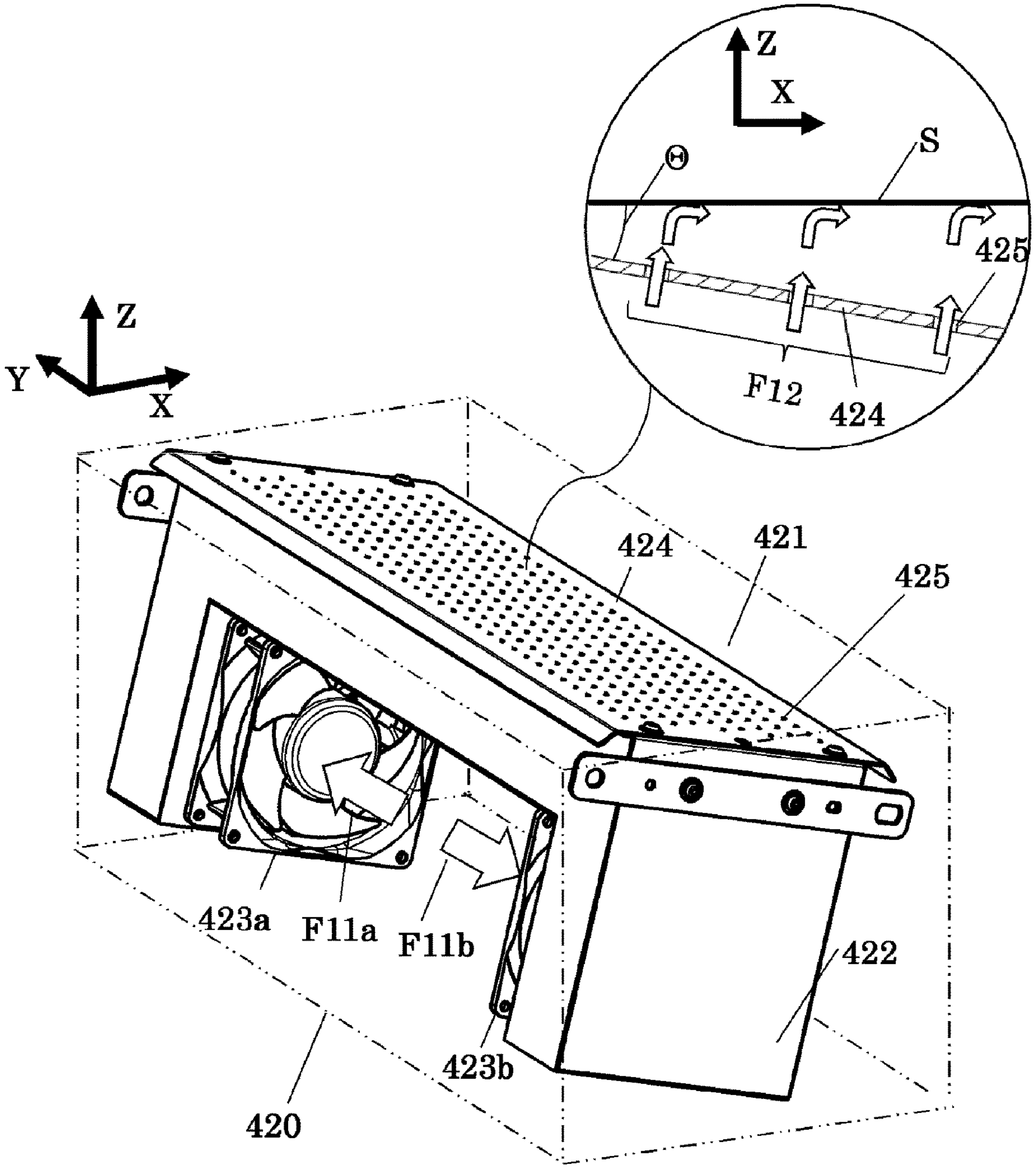
FIG. 5 is a perspective view showing the configuration of a first nozzle.

The configuration of the first space 420 will be described using FIG. 5. FIG. 5 is a perspective view of the first nozzle 421. The first nozzle 421 has a first nozzle housing 422, a plurality of first air blowing fans 423*a* and 423*b* (that will be also indicated as first air blowing fans 423 below when not distinguished from each other), and a first nozzle surface 424.

The first air blowing fans 423 are first air blowing units that supply air inside of the first space 420 to the first nozzle 421 so as to be blown out from the first nozzle 421 to the sheet S. Air is taken in the first nozzle housing 422 from the first space 420 in an arrow F11*a* direction (+Y-direction) and an arrow F11*b* direction (−Y-direction) by the first air blowing fan 423*a* and the first air blowing fan 423*b*, respectively. The taken air flows in the first nozzle housing 422, is blown out in an arrow F12 direction (direction perpendicular to the first nozzle surface 424) from the first nozzle surface 424, and is blown against the sheet S. The first nozzle surface 424 has a plurality of round-hole-shaped through-holes 425 having a small diameter (for example, 1.5 to 5 mm) periodically provided therein, and is configured so that the air is uniformly blown out from the plurality of through-holes 425 to the sheet S. Note that the shape of the through-holes 425 of the first nozzle surface 424 is not limited to a round hole. As another configuration, the first nozzle surface 424 may have slit holes having a linear shape, holes having an elliptic shape, or a combination of such holes.

The first nozzle surface 424 is tilted with respect to a recording surface (parallel to an XY-plane) of the sheet S, and an interval in the Z-direction between the first nozzle surface 424 and the sheet S increases toward the second space 430. In other words, the interval in the Z-direction between the first nozzle surface 424 and the sheet S increases toward the downstream side (+X-direction) in the conveyance direction of the sheet S. Accordingly, the direction (arrow F12) in which the air is blown out from the first nozzle 421 has a component (component (+X-direction component) directed toward the downstream side in the conveyance direction) directed toward the second space 430. Therefore, the air blown out in the arrow F12 direction perpendicular to the first nozzle surface 424 comes in contact with the sheet S, and then flows to the downstream side (+X-direction) in the conveyance direction toward the second space 430 along the sheet S. Thus, leakage of the air inside of the drying unit 40 (the first space 420 and the second space 430) from the housing 401 to the upstream side (−X-direction) in the conveyance direction via the first opening 407*a* is suppressed. The first nozzle surface 424 preferably has an angle θ of not more than 45° with respect to the sheet S. In the first embodiment, the first nozzle surface 424 has an angle θ of 10°.

Configuration of Second Space 430

Figure 6:
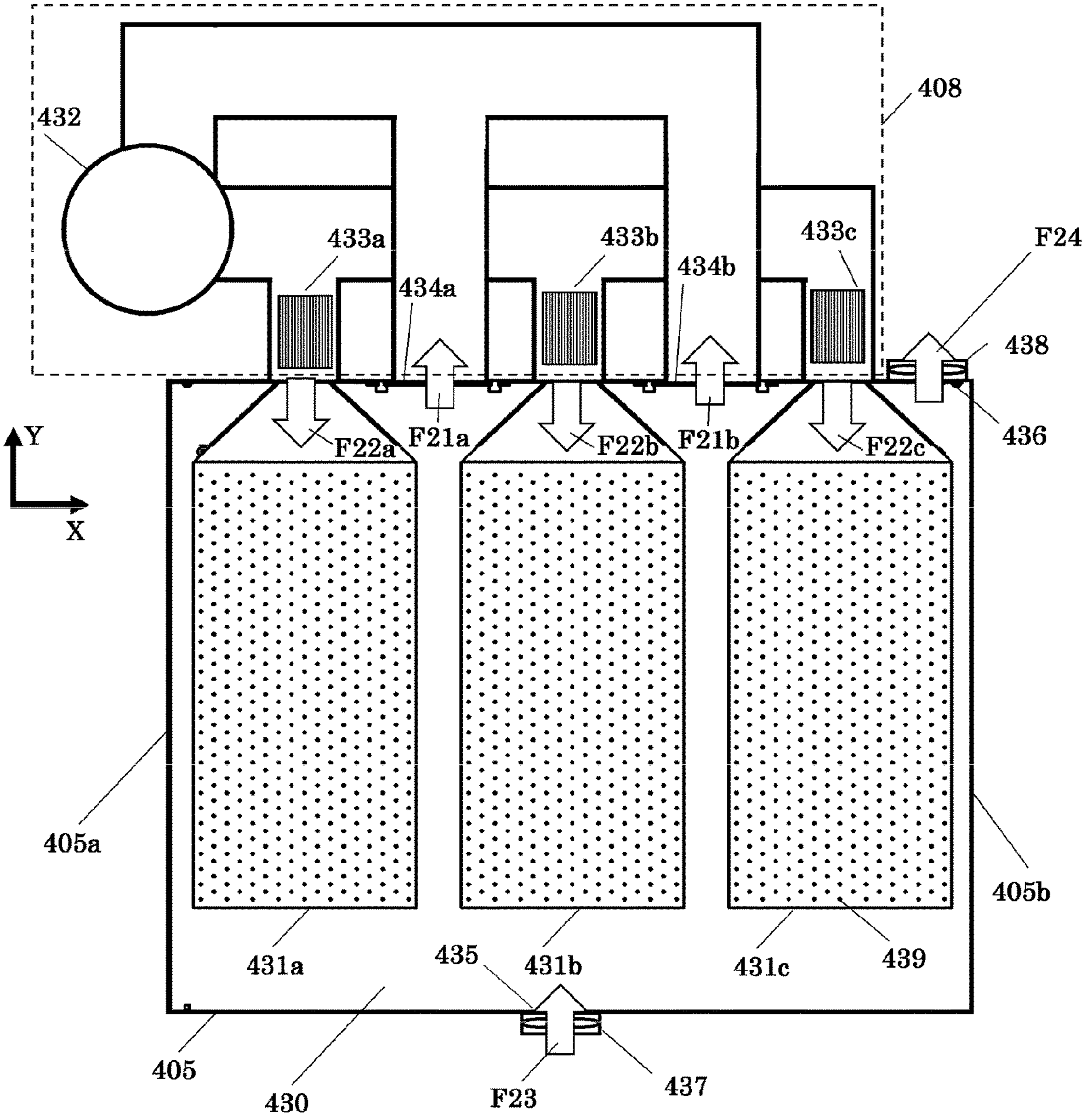
FIG. 6 is a schematic plan view showing the configuration of a second space.

The configuration of the second space 430 will be described using FIG. 6. FIG. 6 is a view obtained when the second space 430 is seen in the −Z-direction from a position of the sheet S. The second space 430 has a second housing 405 and a plurality of second nozzles 431*a*, 431*b*, and 431*c* (that will be also indicated as second nozzles 431 when not distinguished from each other) provided along the conveyance direction. The second housing 405 has the first partition wall 405*a* and the second partition wall 405*b*.

The second housing 405 is provided with the second opening 406*a* that serves as a connection path to supply air to the second nozzles 431, the third opening 406*b*, a plurality of circulation exhaust ports 434*a* and 434*b* (that will be also indicated as circulation exhaust ports 434 below when not distinguished from each other), a ventilation port 435, and an exhaust port 436.

On the outside of the second space 430, an air circulation heating unit 408 having an air blower 432 and a plurality of heaters 433*a*, 433*b*, and 433*c* (that will be also indicated as heaters 433 below when not distinguished from each other) is provided. The heaters 433 heat air inside of the second space 430. The air blower 432 is a second air blowing unit that supplies the air heated by the heaters 433 to the second nozzles 431 so as to be blown out from the second nozzles 431 to the sheet S. The air blower 432 takes in the air inside of the second space 430 in arrow F21*a* and F21*b* directions (that will be also indicated as arrows F21 direction below when not distinguished from each other) (+Y-direction) from the circulation exhaust port 434. The taken air is fed out to the heaters 433 from the air blower 432. The air heated after passing through the heaters 433 flows in arrow F22*a*, F22*b*, and F22*c* directions (that will be also indicated as arrow F22 directions below when not distinguished from each other) (−Y-direction), flows into the second nozzles 431, and is blown against the sheet S in the +Z-direction from the second nozzles 431. The second nozzles 431 have a plurality of round-hole-shaped through-holes 439 having a small diameter (for example, 1.5 to 5 mm) periodically provided therein, and are configured so that the air is uniformly blown out from the plurality of through-holes 439 to the sheet S. Note that the shape of the through-holes 439 of the second nozzles 431 is not limited to a round hole. As another configuration, the second nozzles 431 may have slit holes having a linear shape, holes having an elliptic shape, or a combination of such holes.

The temperature of the air heated by the heaters 433 is detected by an air temperature detection unit not shown. The control unit 21 controls heating of the heaters 433 according to a prescribed target temperature on the basis of a detected temperature. In the first embodiment, the temperature of the air passing through the heaters 433 is controlled in the range of 60 to 150° C.

When a liquid of ink on the sheet S evaporates, a steam pressure inside of the second space 430 increases. If the steam pressure inside of the second space 430 excessively increases, there is a possibility that a prescribed evaporation amount is not obtained, and the ink is not substantially dried. Therefore, air is taken in from the outside of the recording apparatus 1 by a suction fan 437 and an exhaust fan 438 that are provided in the second housing 405 for ventilation.

The suction fan 437 is a suction unit that absorbs and takes in outside air from an opening (not shown) of the recording apparatus 1, and sucks the taken air into the second space 430 in an arrow F23 direction (+Y-direction) crossing the conveyance direction (+X-direction) via the ventilation port 435. The exhaust fan 438 is an exhaust unit that exhausts air from the second space 430 to the outside of the drying unit 40 in an arrow F24 direction (+Y-direction) crossing the conveyance direction (+X-direction) via the exhaust port 436.

Note that ventilation is performed by the suction fan 437 and the exhaust fan 438 in the first embodiment, but a ventilation method is not limited to this. For example, any one of the fans may be provided as another configuration. Further, the ventilation unit may be provided on the side of the air circulation heating unit 408. According to the configuration of the first embodiment, the fans are provided for each of suction and exhaustion inside of the second space 430. Therefore, it is possible to stably maintain an atmospheric pressure or a ventilation amount inside of the second space 430.

Further, any drying mode for blowing an airflow against the sheet S is applicable to the second space 430. For example, the second nozzles 431 and the air circulation heating unit 408 are not limited to the configuration of the first embodiment, but may be realized by any installation number, any air blowing unit, any heating unit, or the like. In addition, it is also possible to use a drying system based on a radiation heater in combination.

Configuration of Third Space 440

Figure 7:
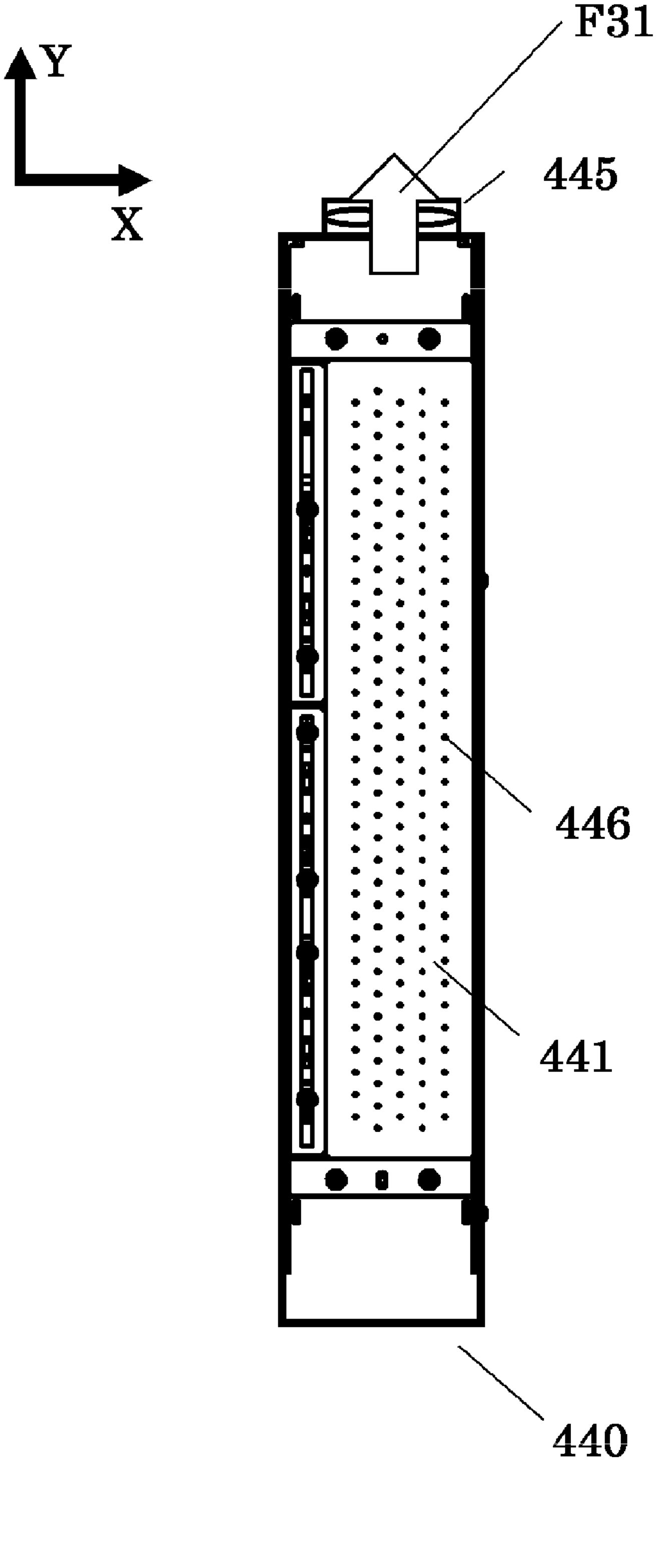
FIG. 7 is a schematic plan view showing the configuration of a third space according to the first embodiment.

The configuration of the third space 440 will be described using FIG. 7. FIG. 7 is a view obtained when the third space 440 is seen in the −Z-direction from the position of the sheet S. The third space 440 is provided on the side (downstream of the second space 430 in the conveyance direction in FIG. 7) opposite to the first space 420 in the conveyance direction (+X-direction) with respect to the second space 430 and communicates with the second space. The third space 440 has the third nozzle 441 and a second air blowing fan 445.

The second air blowing fan 445 is a third air blowing unit that sucks air inside of the third space 440 via the third nozzle 441 and exhausts the same to the outside of the drying unit 40 in an arrow F31 direction (+Y-direction) crossing the conveyance direction so as to be sucked from the sheet S to the third nozzle 441. The third nozzle 441 has a plurality of suction ports 446 periodically provided therein, the suction ports 446 having a small diameter (for example, 1.5 to 5 mm) and formed of round-hole-shaped through-holes. The third nozzle 441 is configured so that air is uniformly sucked in the plurality of suction ports 446 from the side of the sheet S. By the third nozzle 441 positioned on a most downstream side in the conveyance direction (X-direction) of the sheet S in the drying unit 40, high-temperature air inside of the drying unit 40 that flows to the downstream side (+X-direction) in the conveyance direction along the sheet S is sucked. Thus, it is possible to prevent leakage of the high-temperature air inside of the drying unit 40 to the outside of the drying unit 40 on the downstream side (+X-direction) in the conveyance direction via the fourth opening 407*b*. Further, since the pressure inside of the housing 401 becomes negative by the suction of the third nozzle 441, it is possible to more reliably suppress the leakage of the high-temperature air to the outside of the drying unit 40.

The suction ports 446 of the third nozzle 441 are preferably opposed to a surface of the sheet S onto which ink is applied. Further, the suction ports 446 of the third nozzle 441 may be arranged according to the specific gravity of an ink component that vaporizes by drying. In the first embodiment, it is assumed that the specific gravity of a volatile component of ink is heavier than air. Further, ink is applied onto a lower surface of the sheet S. Accordingly, an ink component that vaporizes from the sheet S flows in the −Z-direction from the sheet S. Therefore, the configuration of the first embodiment in which the suction ports 446 are arranged under the sheet S is preferable from the viewpoint of sucking a vaporizing ink component. Note that the shape of the suction ports 446 of the third nozzle 441 is not limited to a round through-hole. As another configuration, the third nozzle 441 may have slit holes having a linear shape, holes having an elliptic shape, or a combination of such holes. Further, in a case where the specific gravity of a volatile component of ink is lighter than air, the third nozzle 441 may be positioned over the sheet S.

Airflow Function inside of Drying Unit 40

Figure 8:
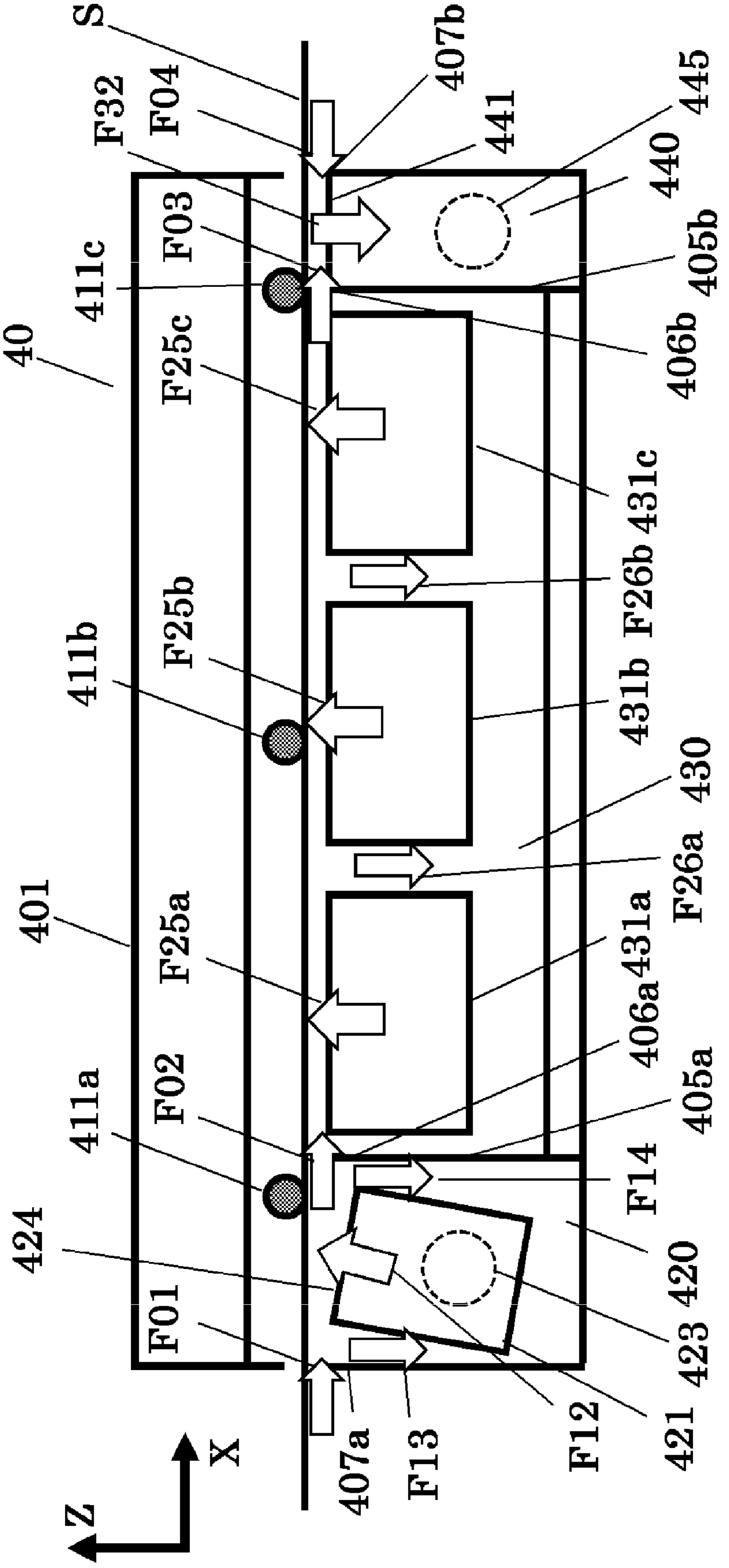
FIG. 8 is a schematic cross-sectional view showing airflows in the drying unit according to the first embodiment.

An airflow function inside of the drying unit 40 will be described using FIG. 8. FIG. 8 is a cross-sectional view of a surface perpendicular to the Y-direction of the drying unit 40 and shows airflows inside of the drying unit 40.

In the first space 420, air is blown against the sheet S in the arrow F12 direction (direction perpendicular to the first nozzle surface 424 and having the +X-direction component) by the first nozzle 421. The blown air mainly flows to the downstream side (arrow F02 direction (+X-direction)) in the conveyance direction. From the second nozzles 431, air is blown against the sheet S in arrow F25*a*, F25*b*, and F25*c* directions (that will be also indicated as arrow F25 directions below when not distinguished from each other) (+Z-direction). By an airflow in the arrow F02 direction, leakage of the air blown against the sheet S in the arrow F25 directions (+Z-direction) from the second nozzles 431 to the upstream side (−X-direction) in the conveyance direction via the second opening 406*a* along the sheet S is suppressed.

The first nozzle 421 takes in air inside of the first space 420 by the first air blowing fans 423. By this function, airflows in arrow F13 and F14 directions (directions having a component in the −Z-direction) are generated toward the first air blowing fans 423 inside of the first space 420. By the airflow in the arrow F13 direction, an airflow in an arrow F01 direction (+X-direction) that takes air in the first space 420 from the outside of the drying unit 40 via the first opening 407*a* is generated. Thus, it is possible to suppress leakage of high-temperature air inside of the housing 401 to the outside of the drying unit 40 via the first opening 407*a*.

Further, the temperature of the airflow in the arrow F14 direction along the first partition wall 405*a* becomes higher than a temperature outside of the drying unit 40 due to convection or heat conduction via the first partition wall 405*a* inside of the second space 430 in which heat-dying is performed. That is, air inside of the first space 420 supplied to the first nozzle 421 by the first air blowing fans 423 is heated by heat of air inside of the second space 430 that is transferred via the first partition wall 405*a*. Therefore, the temperature of the air that is taken in by the first air blowing fans 423 and blown from the first nozzle 421 becomes higher than the temperature outside of the drying unit 40. Thus, flowing of low-temperature air outside of the drying unit 40 into the second space 430 is suppressed. As a result, it is possible to favorably dry the sheet S.

In the third space 440, air is sucked in an arrow F32 direction (−Z-direction) from the side of the sheet S by the third nozzle 441. By the suction in the arrow F32 direction, an airflow that takes in air from the second space 430 to the downstream side (arrow F03 direction (+X-direction)) in the conveyance direction via the third opening 406*b* is generated. Further, by the suction in the arrow F32 direction, an airflow that takes in air from the outside of the drying unit 40 to the upstream side (arrow F04 direction (−X-direction)) in the conveyance direction via the fourth opening 407*b* is generated. By the generation of the airflow in the arrow F04 direction, it is possible to suppress leakage of high-temperature air to the downstream side (+X-direction) in the conveyance direction via the fourth opening 407*b* toward the outside of the drying unit 40.

In the second space 430, heated air is blown against the sheet S in the arrow F25 directions (+Z-direction) by the second nozzles 431, and makes it possible to evenly dry ink on the sheet S. A part of the air blown against the sheet S flows from the sheet S to the inside of the second space 430 in arrow F26*a* and F26*b* directions (−Z-direction) (that will be also indicated as arrow F26 directions below when not distinguished from each other). The air is taken from the second space 430 by the air circulation heating unit 408 and reheated. In the second space 430, air flows to the downstream side (arrow F02 direction (+X-direction)) in the conveyance direction via the second opening 406*a* by the function of the first space 420. Then, the air flows to the downstream side (arrow F03 direction (+X-direction)) via the third opening 406*b* by the function of the third space 440.

The temperature of the air flowing in the arrow F02 direction from the first space 420 is higher than the temperature outside of the drying unit 40. Therefore, compared with a case where air flows in the second space 430 from the outside of the drying unit 40, a reduction in the temperature of the second space 430 is suppressed. As a result, it is possible to favorably dry the sheet S. Further, since the air flowing in the third space 440 in the arrow F03 direction is sucked by the third nozzle 441, it is possible to suppress leakage of high-temperature air to the downstream side (+X-direction) in the conveyance direction via the fourth opening 407*b* toward the outside of the drying unit 40. Further, control is performed according to recording conditions by control that will be described later to reduce an inflow amount and an outflow amount. As a result, it is possible to suppress energy required to operate the recording apparatus 1.

Control of Drying Unit 40

Figure 9:
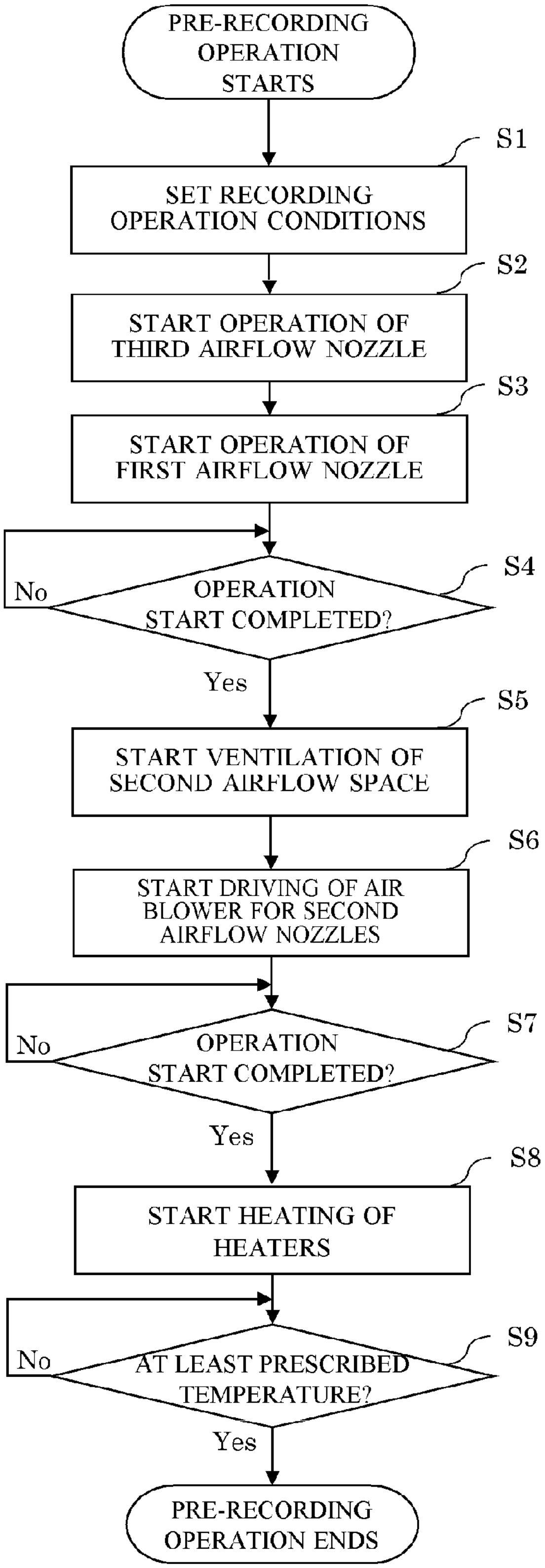
FIG. 9 is a flowchart showing a control procedure of the drying unit in a recording preparation operation.

Control of the drying unit 40 that is performed by the control unit 21 will be described using the flowchart of FIG. 9. When recording data is transmitted from a host apparatus 25 to the control unit 21, a recording preparation operation that is a preparation operation for recording in the recording apparatus 1 starts.

In step S1, the control unit 21 determines, according to recording conditions, control values of respective units of the drying unit 40 on the basis of a control table shown in Table 1.

As an example of the control values determined in the control table according to the recording conditions, the duty D1 of the first air blowing fans 423 and the duty D3 of the second air blowing fan 445 are set at larger values as the conveyance speed of a recording medium is faster. Thus, the faster the conveyance speed, the larger airflow amounts of the first nozzle 421 and the third nozzle 441 become. Further, in the case of a recording condition on which airflow amounts of the second nozzles 431 are required to be suppressed, the duty D2 of the air blower 432 is set at a small value, and the duty D1 of the first air blowing fans 423 and the duty D3 of the second air blowing fan 445 are set at small values. That is, the first air blowing fans 423, the air blower 432, and the second air blowing fan 445 are controlled so that the airflow amounts of the first nozzle 421 and the third nozzle 441 become smaller as the airflow amount of the second nozzles 431 is smaller. Thus, the airflow amounts of the first nozzle 421 and the third nozzle 441 are reduced. Besides, combinations of appropriate control values corresponding to combinations of various recording conditions are set in advance by an experiment or the like and stored in a storage unit such as a non-volatile memory of the control unit 21 as the control table. The control unit 21 acquires the control values for controlling the respective units of the recording apparatus 1 by referring to the control table according to the recording conditions and controls the operations of the respective units on the basis of the control values.

TABLE 1

| CONDITION NUMBER | FIRST NOZZLE DUTY D1 OF FIRST AIR BLOWING FAN | TEMPERATURE T2 OF SECOND NOZZLE | SECOND NOZZLE DUTY D2 OF AIR BLOWER | THIRD NOZZLE DUTY D3 OF SECOND AIR BLOWING FAN |
|---|---|---|---|---|
| CONDITION 1 | D11 | T21 | D21 | D31 |
| CONDITION 2 | D12 | T22 | D22 | D32 |
| . | . | . | . | . |
| . | . | . | . | . |
| . | . | . | . | . |
| CONDITION N | D1N | T2N | D2N | D3N |

The recording conditions are determined on the basis of the type of a recording medium, recording density, the conveyance speed of the recording medium, a designated value by a user, or the like. The control values determined according to the recording conditions include a duty D1 of the first air blowing fans 423, a duty D2 of the air blower 432, a duty D3 of the second air blowing fan 445, and an airflow temperature T2 of the second nozzles 431. The duties of respective air blowing sources of the first air blowing fans 423, the air blower 432, and the second air blowing fan 445 show pulse widths in a case where driving of the respective air blowing sources is PWM-controlled, and take a value of duty 0% (stop) to duty 100% (full-speed rotation). Note that the first embodiment describes an example in which the respective air blowing sources are controlled by the duties determined by referring to the control table of Table 1. However, a control method for the respective air blowing sources is not limited to this. For example, as another configuration, the respective air blowing sources may be feedback-controlled on the basis of target values and detection values of the pressures inside of the respective nozzles with pressure detection units provided in the respective nozzles of the first nozzle 421, the second nozzles 431, and the third nozzle 441. Note that an operation of at least one of the first air blowing fans 423, the air blower 432, or the second air blowing fan 445 may be controlled according to conditions for a recording operation by the recording unit 8.

In step S2, the control unit 21 starts driving of the second air blowing fan 445 of the third nozzle 441 on the basis of the control values determined in step S1.

In step S3, the control unit 21 starts driving of the first air blowing fans 423 of the first nozzle 421 on the basis of the control values determined in step S1.

In step S4, the control unit 21 determines whether the driving of the first air blowing fans 423 and the second air blowing fan 445 in steps S1 and S2 has been completed. In the first embodiment, an encoder for detecting rotation amounts of the first air blowing fans 423 and the second air blowing fan 445 is provided. The control unit 21 determines that the driving has been completed when encoder values are values within a prescribed range.

In step S5, the control unit 21 drives the suction fan 437 and the exhaust fan 438 for ventilation of the second space 430. Control of the suction fan 437 and the exhaust fan 438 may be performed on the basis of a control table determined in advance like control of the respective nozzles.

In step S6, the control unit 21 starts driving of the air blower 432 for the second nozzles 431 on the basis of the control values determined in step S1.

In step S7, the control unit 21 determines whether the driving of the suction fan 437, the exhaust fan 438, and the air blower 432 in steps S5 and S6 has been completed. In the first embodiment, an encoder for detecting rotation amounts of the suction fan 437, the exhaust fan 438, and the air blower 432 is provided. The control unit 21 determines that the driving has been completed when encoder values are values within a prescribed range.

Note that a determination method in steps S4 and S7 is not limited to a determination based on encoder values but may be, for example, a determination based on internal pressure values of the nozzles or an elapsed time since the start of the driving. The determination based on detection values such as encoder values and internal pressure values is preferable in terms of more reliable operation confirmation.

In step S8, the control unit 21 starts heating control of the heaters 433 on the basis of the control values determined in step S1. The control unit 21 detects the temperature of air heated by the heaters 433 by the air temperature detection unit not shown, and controls heating of the heaters 433 according to a target temperature T and the detected temperature.

In step S9, the control unit 21 determines whether the temperature of the air heated by the heaters 433 has become at least the target temperature. When the temperature of the heated air has become at least the target temperature, the control unit 21 ends the recording preparation operation.

Through the operations before step S3, leakage of air to the outside of the drying unit 40 is suppressed by functions of airflows in the first nozzle 421 and the third nozzle 441. Then, the second nozzles 431 in the second space 430 that is an area where drying is performed by heated air are operated after step S4. Thus, it is possible to favorably maintain a state inside of the recording apparatus 1. Further, heating control is performed in the second space 430 after airflows before and after the second space 430 are generated by performing the processing before step S4 with application of control values based on recording conditions. Thus, it is possible to suppress the influence of the airflows on a drying process in the second space 430.

According to the first embodiment, it is possible to suppress leakage of hot air from the drying unit 40 to the inside of the recording apparatus 1 in the conveyance direction and favorably dry the sheet S in the second space 430.

Note that the first embodiment exemplifies the configuration in which the nozzles are arranged under (at positions in the −Z-direction of) the sheet S in the respective spaces. However, the nozzles may be arranged over (at positions in the +Z-direction of) the sheet S as another configuration. Further, the first embodiment exemplifies the configuration in which the first space 420 is positioned upstream of the second space 430 and the third space 440 is positioned downstream of the second space 430 in the conveyance direction. However, the first space 420 may be positioned downstream of the second space 430, and the third space 440 may be positioned upstream of the second space 430.

Second Embodiment

Figure 10:
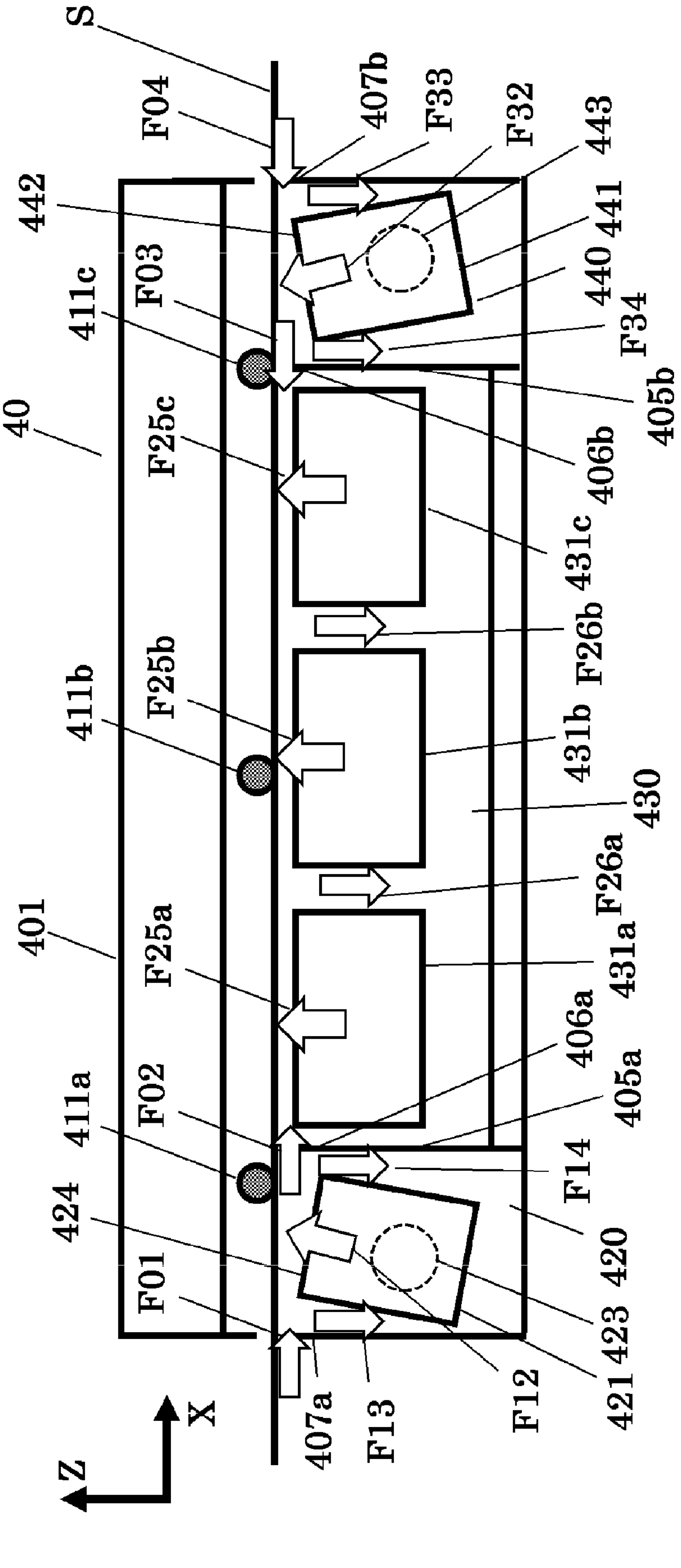
FIG. 10 is a schematic cross-sectional view showing airflows in a drying unit according to a second embodiment.

A second embodiment is different from the first embodiment in the configuration of a third space. FIG. 10 is a cross-sectional view of a surface perpendicular to a Y-direction of a drying unit 40 according to the second embodiment and shows airflows inside of the drying unit 40. In the second embodiment, a third space 440 is configured to be symmetrical to a first space 420 in an X-direction.

A third nozzle surface 442 of a third nozzle 441 is tilted with respect to a recording surface of a sheet S, and an interval in a Z-direction between the third nozzle surface 442 and the sheet S increases toward a second space 430. In other words, the interval in the Z-direction between the third nozzle surface 442 and the sheet S increases toward an upstream side (+X-direction) in a conveyance direction of the sheet S. Accordingly, a direction (arrow F32) in which air is blown out from the third nozzle 441 has a component (component (−X-direction component) directed toward the upstream side in the conveyance direction) directed toward the second space 430. Therefore, the air blown out in the arrow F32 direction perpendicular to the third nozzle surface 442 comes in contact with the sheet S, and then flows to the upstream side (−X-direction) in the conveyance direction toward the second space 430 along the sheet S. Thus, leakage of air inside of the drying unit 40 (the second space 430 and the third space 440) from a housing 401 to a downstream side (+X-direction) in the conveyance direction via a fourth opening 407*b* is suppressed. The third nozzle surface 442 preferably has an angle θ of not more than 45° with respect to the sheet S. In the second embodiment, the third nozzle surface 442 has an angle θ of 10°.

The third nozzle 441 according to the second embodiment has third air blowing fans 443 that are second air blowing units to supply air inside of the third space 440 to the third nozzle 441 like the first air blowing fans 423 of the first nozzle 421. The third nozzle 441 takes in air inside of the third space 440 by the third air blowing fans 443. By this function, airflows in arrow F33 and F34 directions (directions having a component in the −Z-direction) are generated toward the third air blowing fans 443 inside of the third space 440. By the airflow in the arrow F33 direction, an airflow that takes air to the upstream side (arrow F04 direction (−X-direction)) in the conveyance direction from the outside of the drying unit 40 via the fourth opening 407*b* is generated. Thus, it is possible to suppress leakage of high-temperature air inside of the housing 401 to the outside on the downstream side (+X-direction) in the conveyance direction via the fourth opening 407*b*. Further, the temperature of the airflow in the arrow F34 direction becomes higher than a temperature outside of the drying unit 40 due to convection or heat conduction via a second partition wall 405*b* inside of the second space 430 in which heat-dying is performed. Therefore, the temperature of the air that is taken in by the third air blowing fans 443 and blown from the third nozzle 441 becomes higher than the temperature outside of the drying unit 40. By such a circulation mode, flowing of low-temperature air outside of the drying unit 40 into the second space 430 is suppressed. As a result, it is possible to favorably dry the sheet S.

Note that an airflow generated in an arrow F02 direction (+X-direction) by the first nozzle 421 and an airflow generated in an arrow F03 direction (−X-direction) by the third nozzle 441 are collectable by increasing an exhaust amount inside of the second space 430, specifically a driving amount of an exhaust fan 438. Thus, it is possible to maintain airflow directions indicated as the arrow F01 direction and the arrow F04 direction in which air is taken in the first space 420 and the third space 440 from the outside of the drying unit 40.

According to the second embodiment, the same effects as those of the first embodiment are obtained by an airflow blown out from the third nozzle 441. Further, compared with the second air blowing fan 445 that is an air blowing source in a configuration that sucks air in the third nozzle 441 according to the first embodiment, the third air blowing fan 443 that is an air blowing source according to the second embodiment may have lower rating. Further, compared with the third nozzle 441 according to the first embodiment, the third nozzle 441 according to the second embodiment may have a wider interval between the third nozzle surface 442 and the sheet S in the Z-direction.

Note that the second embodiment exemplifies the configuration in which the spaces (first space 420 and third space 440) having the function of directing airflows to the second space 430 are provided on both sides in the conveyance direction with respect to the second space 430 in which a drying process is performed. However, a space may be provided on one of upstream and downstream sides.

Third Embodiment

Figure 11:
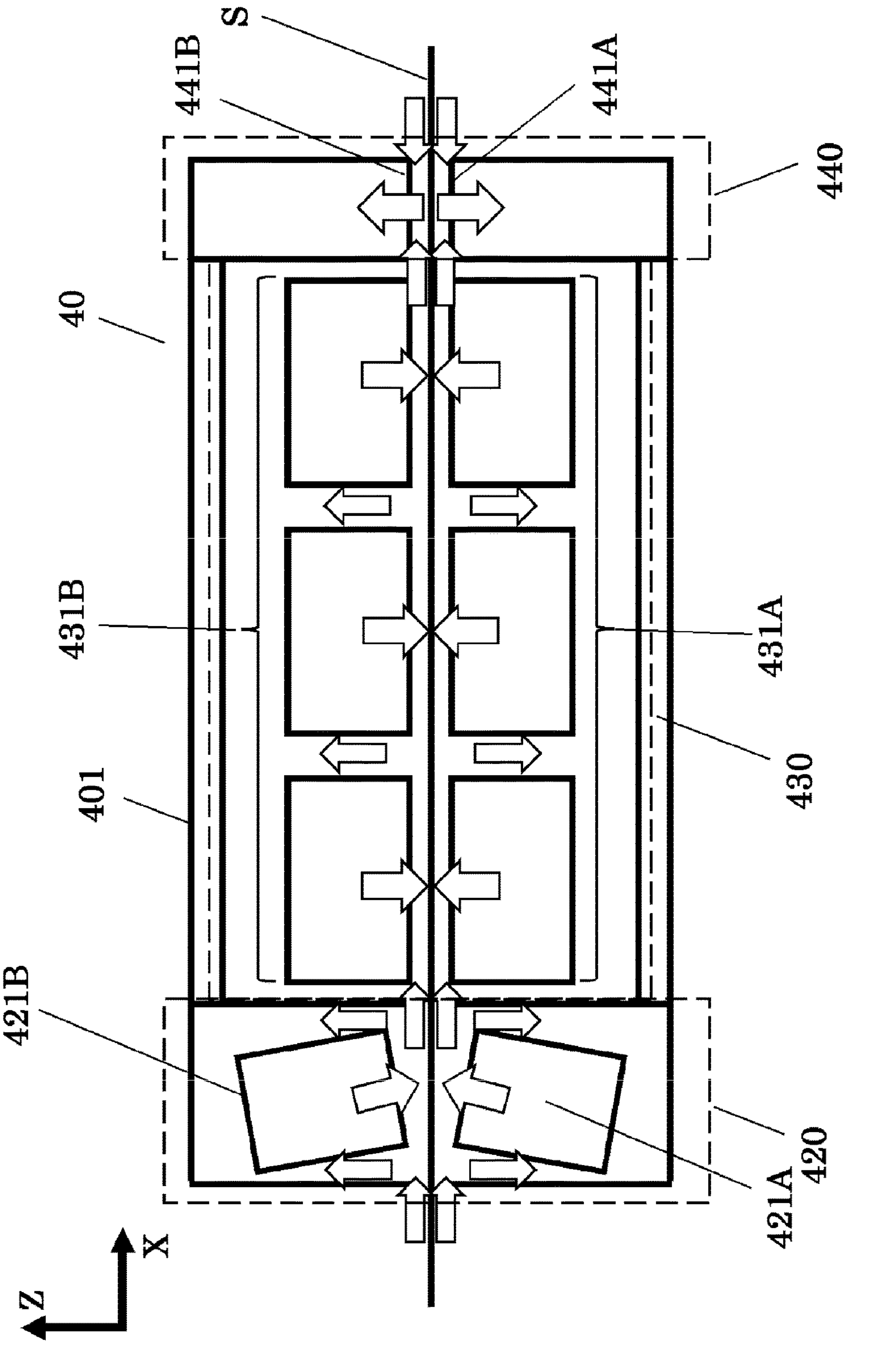
FIG. 11 is a schematic cross-sectional view showing airflows in a drying unit according to a third embodiment.

A third embodiment is different from the first embodiment in arrangement of nozzles in respective spaces. FIG. 11 is a cross-sectional view of a surface perpendicular to a Y-direction of a drying unit 40 according to the third embodiment and shows airflows inside of the drying unit 40. The first embodiment exemplifies the configuration in which the nozzles are arranged under (at the positions in the −Z-direction of) the sheet S in the respective spaces. However, in the third embodiment, the nozzles are arranged in the +Z-direction on both sides under and over (at positions in a +Z-direction of) a sheet S with intervals in the respective spaces. As shown in FIG. 11, a first nozzle 421A is provided under the sheet S, and a first nozzle 421B is provided over the sheet S in a first space 420. Further, a second nozzle 431A is provided under the sheet S, and a second nozzle 431B is provided over the sheet S in a second space 430. Further, a third nozzle 441A is provided under the sheet S, and a third nozzle 441B is provided over the sheet S in a third space 440. The first space 420, the second space 430, and the third space 440 extend to both sides of the sheet S in the Z-direction as indicated by dashed lines in FIG. 11. The functions and effects of the respective spaces are the same as those of the first embodiment.

According to the third embodiment, the first nozzles 421, the second nozzles 431, and the third nozzles 441 are provided so as to be opposed to both surfaces of the sheet S. Accordingly, since amounts of airflows blown against the sheet S in the drying unit 40 are increased, it is possible to perform drying in a shorter period of time. Note that at least one of the first nozzles 421, the second nozzles 431, or the third nozzles 441 may be opposed to both surfaces of the sheet S.

Fourth Embodiment

A fourth embodiment is different from the first embodiment in the configuration of a sheet support unit. The first embodiment exemplifies the configuration in which the sheet S is conveyed while being supported in a plane shape by the sheet support unit 410 in the drying unit 40. In the fourth embodiment, a sheet S is conveyed while being supported along an outer peripheral surface of a column-shaped support member by a sheet support unit 410 in a drying unit 40.

Figure 12:
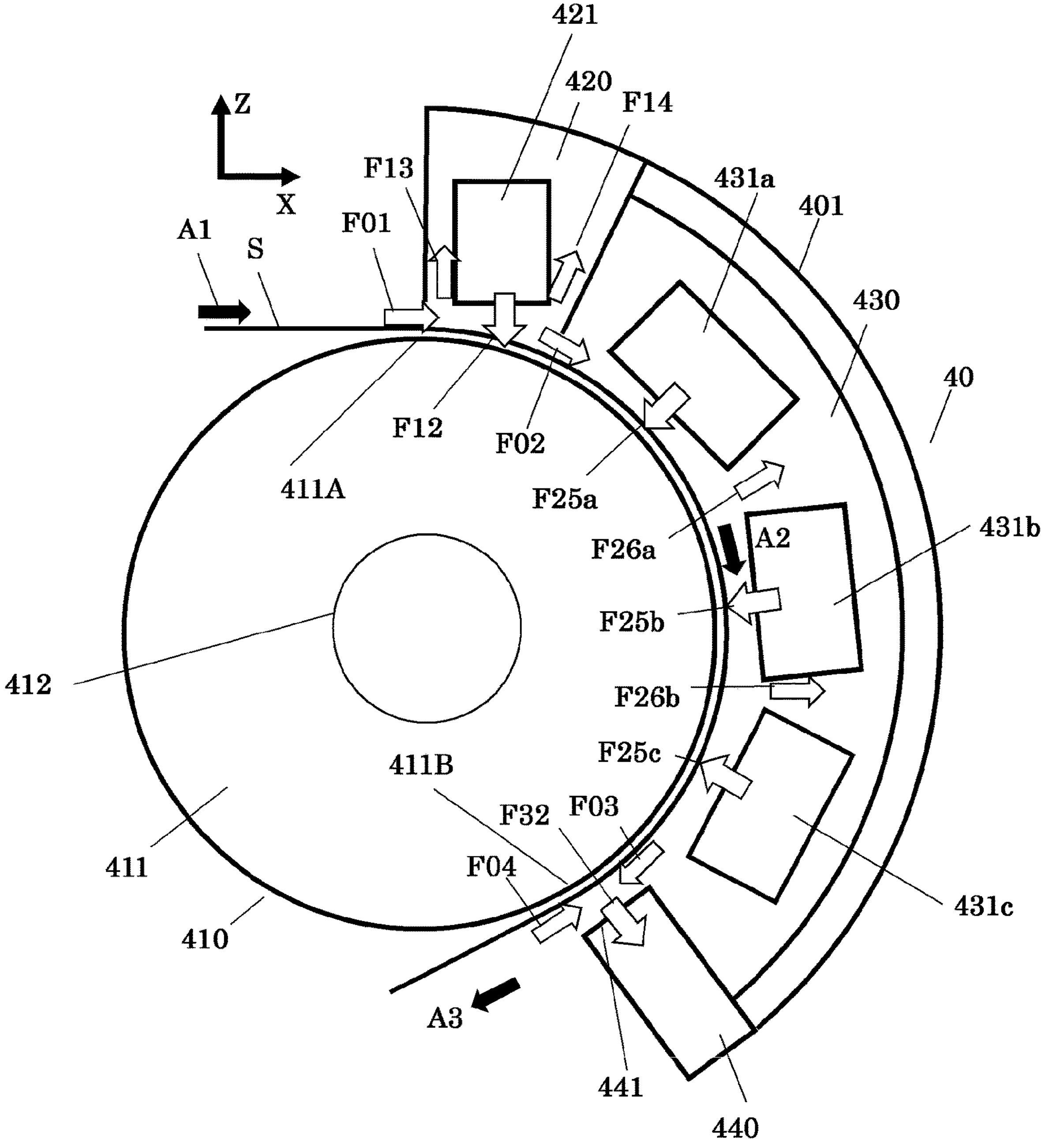
FIG. 12 is a schematic cross-sectional view showing airflows in a drying unit according to a fourth embodiment.

FIG. 12 is a cross-sectional view of a surface perpendicular to a Y-direction of the drying unit 40 according to the fourth embodiment and shows airflows inside of the drying unit 40. A sheet support roller 411 of the sheet support unit 410 according to the fourth embodiment has a diameter larger than that of the sheet support roller 411 of the sheet support unit 410 according to the first embodiment. The sheet support unit 410 according to the fourth embodiment supports and conveys the sheet S by winding the sheet S from a contact point 411A to a separation point 411B along an outer peripheral surface of the sheet support roller 411 having the large diameter. In the example of FIG. 12, when attention is paid to a certain position in a conveyance direction of the sheet S, the sheet S first approaches the sheet support roller 411 in an arrow A1 direction (a tangential direction of the outer peripheral surface of the sheet support roller 411 at the contact point 411A). Then, the sheet S is conveyed in an arrow A2 direction (a direction along the outer peripheral surface of the sheet support roller 411) while being supported by the sheet support roller 411. After that, the sheet S separates from the sheet support roller 411 in an arrow A3 direction (a tangential direction of the outer peripheral surface of the sheet support roller 411 at the separation point 411B).

The drying unit 40 is arranged on the outside of the outer peripheral surface of the sheet support roller 411 along the arrow A2 direction that is a conveyance direction along the outer peripheral surface of the sheet support roller 411 of the sheet S. The functions and effects of respective spaces constituting the drying unit 40 are the same as those of the first embodiment.

The sheet S is wound along the outer peripheral surface of the sheet support roller 411. Therefore, the clearance between the sheet S and respective nozzles is favorably maintained, and the functions of airflows by the respective nozzles are stabilized. Further, since the sheet support roller 411 contacts the sheet S for a long period of time, the sheet support roller 411 may be configured to have a drying unit. For example, when the sheet support roller 411 has a heater 412 provided therein and is configured so that heat by the heater 412 is transferred to the outer peripheral surface of the sheet support roller 411, it is possible to heat the sheet S and assist drying by heat transfer to the sheet S according to a contact time.

According to the fourth embodiment, it is possible to stabilize airflows acting on the sheet S. Further, it is possible to perform drying in a shorter period of time with the heater 412 provided in the sheet support roller 411.

Note that the sheet support unit 410 is not limited to supporting of the sheet S by a cylindrical roller but may be configured to support the sheet S by, for example, an endless belt.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066759, filed on Apr. 14, 2023, which is hereby incorporated by reference herein in its entirety.

What is claimed is:

1. A recording apparatus comprising:

a recording unit that ejects ink onto a recording medium conveyed in a conveyance direction by a conveyance unit; and a drying unit that is provided downstream of the recording unit in the conveyance direction and that blows air against the recording medium while conveying the same to dry the ink on the recording medium, wherein the drying unit includes (1) a first space, (2) a first nozzle that is provided in the first space and that opens opposite to the recording medium, (3) a first air blowing unit that supplies air inside of the first space to the first nozzle so that the air blows out from the first nozzle to the recording medium, (4) a second space that is provided adjacent to the first space on a downstream side in the conveyance direction of the first space and communicates with the first space, (5) a partition wall that partitions the first space and the second space, the partition wall having a second opening that provides communication between the first space and the second space, (6) a second nozzle that is provided in the second space and that opens opposite to the recording medium, (7) a heater that heats air inside of the second space, and (8) a second air blowing unit that supplies air heated by the heater to the second nozzle so that the air blows out from the second nozzle to the recording medium, and wherein a direction in which air is blown out from the first nozzle has a component directed toward the second space in the conveyance direction.

2. The recording apparatus according to claim 1, wherein the first nozzle includes a nozzle surface and a plurality of blowing ports that are provided in the nozzle surface and that blow out air in a direction perpendicular to the nozzle surface, wherein an interval between the nozzle surface and the recording medium increases toward the second space in the conveyance direction.

3. The recording apparatus according to claim 1, wherein the first space communicates with the outside of the drying unit via a first opening, wherein the first opening is positioned on a side opposite to the second space in the conveyance direction with respect to the first nozzle, and wherein the second opening is positioned on the same side as the second space in the conveyance direction with respect to the first nozzle.

4. The recording apparatus according to claim 1, wherein the air inside of the first space that is supplied to the first nozzle by the first air blowing unit is heated by heat of the air inside of the second space that is transferred via the partition wall.

5. The recording apparatus according to claim 1, further comprising:

an exhaust unit that exhausts the air inside of the second space to the outside of the drying unit in a direction crossing the conveyance direction; and a suction unit that sucks air outside of the drying unit into the second space.

6. The recording apparatus according to claim 1, wherein a plurality of the second nozzles are provided along the conveyance direction in the second space.

7. The recording apparatus according to claim 1, wherein a plurality of the first spaces are provided, wherein one of the first spaces is positioned upstream of the second space in the conveyance direction, and wherein another of the first spaces is positioned downstream of the second space in the conveyance direction.

8. The recording apparatus according to claim 1, wherein the first nozzle is positioned opposite to both surfaces of the recording medium.

9. The recording apparatus according to claim 1, wherein the second nozzle is positioned opposite to both surfaces of the recording medium.

10. The recording apparatus according to claim 1, wherein the recording medium is conveyed while being supported in a plane shape in the drying unit.

11. The recording apparatus according to claim 1, wherein the recording medium is conveyed while being supported along an outer peripheral surface of a column-shaped support member in the drying unit.

12. The recording apparatus according to claim 1, wherein the recording medium is a continuous sheet-shaped recording medium.

13. The recording apparatus according to claim 1, further comprising:

a third space that is provided adjacent to the second space on a downstream side in the conveyance direction of the second space and that communicates with the second space, and a third air blowing unit that is provided in the third space, sucks air inside of the third space via a third nozzle open opposite to the recording medium, and exhausts the air inside of the third space to outside of the drying unit.

14. The recording apparatus according to claim 13, wherein the third air blowing unit exhausts the air inside of the third space to the outside of the drying unit in a direction crossing the conveyance direction.

15. The recording apparatus according to claim 13, wherein the third space is partitioned from the second space by a second partition wall having a third opening that provides communication between the second space and the third space, wherein the third space communicates with the outside of the drying unit via a fourth opening, wherein the third opening is positioned on the same side as the second space with respect to the third nozzle, and wherein the fourth opening is positioned on a side opposite to the second space with respect to the third nozzle.

16. The recording apparatus according to claim 13, wherein specific gravity of a volatile component of the ink is heavier than air, and wherein the third nozzle is positioned under the recording medium.

17. The recording apparatus according to claim 13, wherein specific gravity of a volatile component of the ink is lighter than air, and wherein the third nozzle is positioned over the recording medium.

18. The recording apparatus according to claim 13, wherein the third nozzle is positioned opposite to both surfaces of the recording medium.

19. The recording apparatus according to claim 13, further comprising at least one memory and at least one processor which function as a control unit configured to control an operation of at least one of the first air blowing unit, the second air blowing unit, or the third air blowing unit according to a condition for a recording operation by the recording unit.

20. The recording apparatus according to claim 19, wherein the control unit controls the first air blowing unit and the third air blowing unit so that airflow amounts of the first nozzle and the third nozzle become larger as a conveyance speed of the recording medium is faster.

21. The recording apparatus according to claim 19, wherein the control unit controls the first air blowing unit, the second air blowing unit, and the third air blowing unit so that airflow amounts of the first nozzle and the third nozzle become smaller as an airflow amount of the second nozzle is smaller.

* * * * *